(12) United States Patent
Kohlen et al.

(10) Patent No.: US 7,007,926 B2
(45) Date of Patent: Mar. 7, 2006

(54) FLAP VALVE HAVING DUAL PISTON SEALING RINGS

(75) Inventors: Peter Kohlen, Neu-Anspach (DE); Michael Rennen, Bad Soden (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 11/014,994

(22) Filed: Dec. 20, 2004

(65) Prior Publication Data

US 2005/0129550 A1 Jun. 16, 2005

Related U.S. Application Data

(63) Continuation of application No. PCT/DE03/03262, filed on Sep. 30, 2003.

(30) Foreign Application Priority Data

Nov. 1, 2002 (DE) ............................... 102 51 384

(51) Int. Cl.
 *F16K 1/22* (2006.01)
(52) U.S. Cl. ...................... 251/173; 251/175; 251/306
(58) Field of Classification Search ............... 251/306, 251/307, 173, 175, 192
See application file for complete search history.

(56) References Cited

U.S. PATENT DOCUMENTS

| | | | |
|---|---|---|---|
| 1,419,781 A | 6/1922 | Trippensee | |
| 1,860,619 A * | 5/1932 | Pfau | 251/175 |
| 1,956,513 A | 4/1934 | Neault et al. | |
| 2,059,656 A * | 11/1936 | Ring | 251/175 |
| 2,380,821 A | 7/1945 | Breeler et al. | |
| 2,840,338 A | 6/1958 | Shaw | |
| 3,902,697 A * | 9/1975 | Robinson | 251/306 |
| 3,991,455 A | 11/1976 | Bergeron | |
| 4,240,644 A | 12/1980 | Busto | |
| 4,290,615 A * | 9/1981 | Etcheverry | 251/307 |
| 4,384,729 A | 5/1983 | Birenbaum | |
| 4,632,360 A * | 12/1986 | DeSalve | 251/175 |
| 4,872,642 A * | 10/1989 | Oshima | 251/173 |
| 5,020,490 A | 6/1991 | Seko | |
| 5,326,077 A | 7/1994 | Spencer et al. | |
| 5,531,205 A * | 7/1996 | Cook et al. | 251/306 |
| 6,439,255 B1 * | 8/2002 | Chamberlain | 251/175 |
| 6,604,516 B1 * | 8/2003 | Krimmer et al. | 251/306 |
| 6,739,579 B1 * | 5/2004 | Rim | 251/306 |

FOREIGN PATENT DOCUMENTS

DE 38 39 968 A1 5/1990

(Continued)

OTHER PUBLICATIONS

Derwent Abstract—FR-2 683 289; May 7, 1993; Alain Verdelet; (France).
Derwent Abstract—DE-199 34 113 A1; Jan. 25, 2001; Robert Bosch GmbH, D-70469 Stuttgart (Germany).
Derwent Abstract—DE-38 39 968 A1; May 31, 1990; Audi AG, D-8070 Ingoldstadt (Germany).

*Primary Examiner*—John Bastianelli
(74) *Attorney, Agent, or Firm*—Siemens AG; Jacob Eisenberg

(57) ABSTRACT

The invention relates to a valve comprised of a housing with a valve seat for a flap that is rotatably mounted on a drive shaft. The exterior of the flap is provided with a first piston sealing ring and a second piston sealing ring that are placed inside an encircling groove of the flap. Each sealing ring is provided in the form of a metal ring. The first ring has a first gap and the second ring has a second gap that are not aligned with one another. The invention also relates to the use of said valve.

9 Claims, 1 Drawing Sheet

FOREIGN PATENT DOCUMENTS

| | | |
|---|---|---|
| DE | 199 34 113 A1 | 1/2001 |
| FR | 2 683 289 | 5/1993 |
| GB | 732 184 | 6/1955 |
| WO | WO 01/50047 A1 | 7/2001 |

* cited by examiner

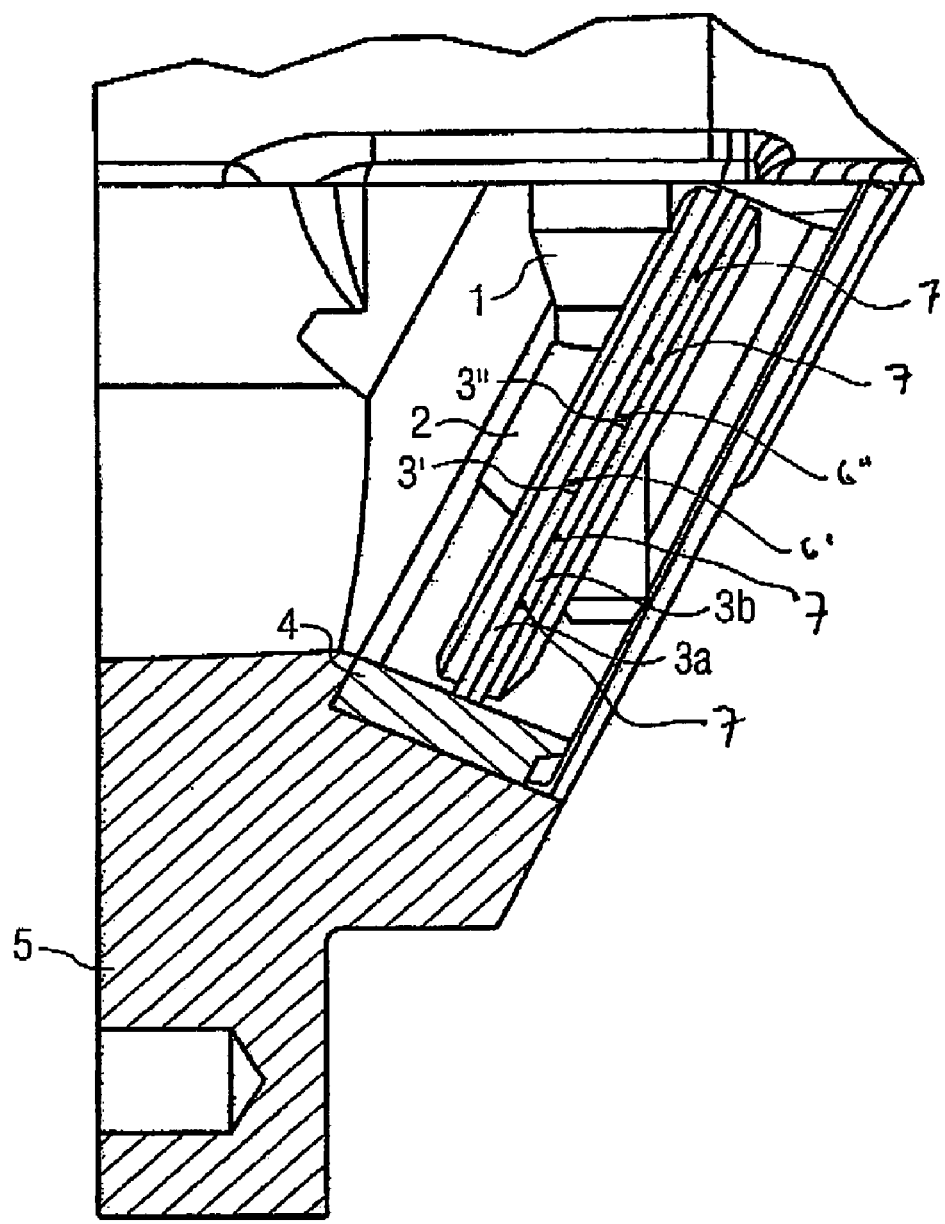

US 7,007,926 B2

FLAP VALVE HAVING DUAL PISTON SEALING RINGS

CROSS REFERENCE TO RELATED APPLICATIONS

The present application is a continuation of international application PCT/DE03/03262, filed on Sep. 9, 2003, which designated the United States and was pending at the time of designation and the filing of the present application; and further claims priority to German patent application 10251384.8, filed Nov. 1, 2002; the both of which are herein incorporated by reference.

BACKGROUND OF THE INVENTION

The invention relates to a valve and to a use of the valve. Valves, for example for gas ducts are known. They often composed of a housing with a valve seat in which a rotatably arranged flap for closing off the gas duct is arranged. In order to avoid leakage air, the flap is provided here with a piston seal which runs around on the outside. The latter is generally composed of a metal ring which has a gap for reasons of flexibility. During operation this often results in the disadvantage that it is often impossible to close said gap completely so that leakage air escapes through said gap, which is not desirable.

FR-A-2 683 289 discloses a valve which is composed of a housing with a valve seat for a flap which is rotatably mounted on a drive shaft, in which valve a first piston sealing ring is arranged on the outside around the flap and a second piston sealing ring is arranged in a circumferential groove in the flap, which rings are each embodied as a metal ring with a first gap or a second gap which are not aligned with one another. This valve is used as a tubular seal.

SUMMARY OF THE INVENTION

The invention is therefore based on the object of providing a valve in which leakage air can largely be prevented from forming. The intension is thus to largely ensure that the gas duct is reliably closed even at higher temperatures, and at fluctuating temperatures, of the gas.

The object on which the invention is based is achieved by the use of a valve having the features of claim 1. The inventive use of the valve is to be considered particularly advantageous because the gases which are conducted through a gas recirculation valve of a motor vehicle generally have high temperatures and large temperature fluctuations and nevertheless the formation of leakage air is avoided. The valve seat may, for example, be itself part of the housing here. The valve is generally of circular design and is composed, for example, of steel. The first piston sealing ring and the second piston sealing ring are each embodied as a flat metal ring. The first piston sealing ring has a first gap. The second piston sealing ring has the second gap. The term joint play is therefore used with respect to both the first gap and the second gap. It has been surprisingly found that leakage air can largely be provided from forming if the first gap and the second gap are positioned in such a way that they are not aligned with one another. This can be done, for example, by attaching both the first piston sealing ring and the second piston sealing ring to the flap of the valve by the single spot weld. This ensures that the first gap is prevented from aligning with the second gap owing to the fixed positioning of the first piston sealing ring and of the second piston sealing ring. This advantageously prevents leakage air being able to be conducted either through the first gap or the second gap. This is particularly advantageous if the gases to be conducted through the valve are at relatively high temperatures and fluctuate in their temperature to a great extent. In individual cases it may also be advantageous to embody the first piston sealing ring or the second piston sealing ring as an externally clamped piston sealing ring and the respectively adjacent piston sealing ring as an internally clamped piston sealing ring. In such a case relative movement between the rings with respect to one another would be possible but the first gap would be prevented from aligning with the second gap.

One preferred refinement of the invention consists in the fact that a welding spot is arranged in the groove in the flap at the location of the first gap and at the location of the second gap, respectively. It is advantageous here that both the first piston sealing ring and the second piston sealing ring do not need to be connected to the flap at one point. The first gap is prevented from aligning with the second gap by the welding spots in the groove in the flap in a relatively simple way.

According to a further preferred refinement of the invention there is provision for the first piston sealing ring or the second piston sealing ring to have beads on its flat side respectively facing the adjacent piston sealing ring. The beads are punctiform projections which are located directly on the respective flat side. These beads each press onto or into the flat side of the adjacent piston sealing ring, which advantageously leads to a situation in which the first gap is also prevented from aligning with the second gap. Depending on the configuration of the beads, this measure alone may even be sufficient to prevent the first gap from aligning with the second gap so that further precautions for avoiding such an alignment are not necessary.

A further preferred refinement of the invention consists in the fact that the valve seat is embodied as a steel ring which is pressed into the housing. This advantageously increases the resistance of the valve seat to wear.

A further refinement of the invention consists in the fact that a housing made of aluminum is arranged. This can reduce the weight of the valve and at the same time make the valve seat wear-resistant.

BRIEF DESCRIPTION OF THE SEVERAL VIEWS OF THE DRAWINGS

The invention is explained in more detail and by way of example below using the drawing (FIGURE).

The FIGURE shows the valve in cross section.

DETAILED DESCRIPTION OF THE PRESENT INVENTION

In the FIGURE, the valve is illustrated in cross section. The valve is composed of a housing 5 with a valve seat 4 for a flap 2 which is rotatably mounted on a drive shaft 1. A first piston sealing ring 3a is arranged around the flap 2 and a second piston sealing ring 3b is arranged in a circumferential groove in the flap 2. The first piston sealing ring 3a is embodied as a flat metal ring with a first gap 3'. The second piston sealing ring 3b is embodied as a flat metal ring with a second gap 3". The first gap 3' and the second gap 3" are not aligned with one another. This advantageously prevents leakage air from being able to pass from one side of the flap 2 to the other side of the flap 2 via the first piston sealing ring 3a and the second piston sealing ring 3b, and vice versa. The valve seat 4 is embodied as a steel ring which is pressed into the housing 5 which is advantageously fabricated from aluminum. The valve is particularly suitable as a gas recirculation valve of a motor vehicle.

A welding spot 6' and 6" is depicted in the FIGURE arranged in the flap at the location of the first gap 3' and at the location of the second gap 3" respectively. In addition, beads 7 are depicted on the flat side of one of the first and second piston rings which faces the other piston ring.

The invention claimed is:

1. A valve, comprising:
   a housing comprising a flap and a drive shaft, the flap having a valve seat and rotatably mounted on a drive shaft,
   a first piston sealing ring and a second piston sealing ring arranged outside of and around the flap and in a circumferential groove in the flap, the first and second sealing rings being a metal ring having a first gap and a second gap not aligned with the first gap, the valve further defining a gas recirculation valve of a motor vehicle; and
   wherein the first piston sealing ring or the second piston sealing ring comprises beads on its flat side facing an adjacent piston sealing ring.

2. The valve according to claim 1, further comprising a welding spot arranged in the circumferential groove in the flap proximate to the first gap and the second gap.

3. The valve according to claim 1, wherein the valve seat is a steel ring pressed into the housing.

4. The valve according to claim 3, wherein the housing comprises aluminum.

5. The valve according to claim 2, wherein the first piston sealing ring or the second piston sealing ring comprises beads on its flat side facing an adjacent piston sealing ring.

6. The valve according to claim 2, wherein the valve seat is a steel ring pressed into the housing.

7. The valve according to claim 1, wherein the valve seat is a steel ring pressed into the housing.

8. The valve according to claim 6, wherein the housing comprises aluminum.

9. The valve according to claim 7, wherein the housing comprises aluminum.

* * * * *